US010378692B2

(12) United States Patent
Mallette et al.

(10) Patent No.: US 10,378,692 B2
(45) Date of Patent: Aug. 13, 2019

(54) METHOD AND SYSTEM FOR APU OIL LEVEL INDICATION

(71) Applicant: HONEYWELL INTERNATIONAL INC., Morris Plains, NJ (US)

(72) Inventors: Robert Mallette, Mesa, AZ (US); Harold Riley, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 462 days.

(21) Appl. No.: 15/041,168

(22) Filed: Feb. 11, 2016

(65) Prior Publication Data

US 2017/0234483 A1 Aug. 17, 2017

(51) Int. Cl.

| | |
|---|---|
| ***F16N 29/02*** | (2006.01) |
| ***F16N 7/38*** | (2006.01) |
| ***F01D 25/20*** | (2006.01) |
| ***F02C 7/06*** | (2006.01) |
| ***F16N 7/40*** | (2006.01) |
| *B64D 41/00* | (2006.01) |

(52) U.S. Cl.

CPC ............. *F16N 29/02* (2013.01); *F01D 25/20* (2013.01); *F02C 7/06* (2013.01); *F16N 7/38* (2013.01); *F16N 7/40* (2013.01); *B64D 41/00* (2013.01); *F05D 2220/50* (2013.01); *F05D 2260/80* (2013.01); *F05D 2260/98* (2013.01); *F16N 2210/04* (2013.01); *F16N 2250/18* (2013.01)

(58) Field of Classification Search

CPC ........ F16N 29/02; F16N 7/38; F16N 2250/18; F16N 2210/04; B64D 41/00

See application file for complete search history.

(56) References Cited

U.S. PATENT DOCUMENTS

| | | | | |
|---|---|---|---|---|
| 5,831,154 | A | 11/1998 | Guertler et al. | |
| 8,676,436 | B2 | 3/2014 | Raimarckers et al. | |
| 2009/0076677 | A1 | 3/2009 | Walthall et al. | |
| 2011/0010069 | A1 * | 1/2011 | Payne .................. | F01D 21/003 701/100 |

FOREIGN PATENT DOCUMENTS

| | | | |
|---|---|---|---|
| DE | 4118896 | A1 | 12/1992 |
| EP | 2072762 | A1 | 6/2009 |
| FR | 2958911 | A1 | 10/2011 |
| WO | 2013037865 | A1 | 3/2013 |

OTHER PUBLICATIONS

Extended EP Search Report for Application No. 17152075.2-1754, dated Jun. 26, 2017.

EP Examination Report for Application No. 17152075.2 dated May 2, 2018.

* cited by examiner

*Primary Examiner* — Yuen Wong

(74) *Attorney, Agent, or Firm* — Lorenz & Kopf, LLP

(57) ABSTRACT

An auxiliary power unit (APU) oil quantity indication system and method provides a stable and accurate oil quantity indication during startup, mission duration and shutdown. The system determines a gulp value at various stages of operation, which is combined with a raw oil quantity indication to provide an indicated oil quantity.

11 Claims, 2 Drawing Sheets

METHOD AND SYSTEM FOR APU OIL LEVEL INDICATION

TECHNICAL FIELD

This invention generally relates to aircraft auxiliary power units (APUs), and more particularly, this invention relates to a method and system for accurate oil quantity determination and indication for an APU.

BACKGROUND

The primary purpose of an aircraft APU is to provide power to start the main engines. Turbine engines must be accelerated to a high rotational speed to provide sufficient air compression for self-sustaining operation. Smaller jet engines are usually started by an electric motor, while larger engines are usually started by an air turbine motor. Before the engines are to be turned, the APU is started. Once the APU is running, it provides the power to start the aircraft's main engines.

APUs are also used to run accessories while the engines are shut down. This allows the cabin to be comfortable while the passengers are boarding before the aircraft's engines are started. Electrical power is used to run systems for preflight checks. Some APUs are also connected to a hydraulic pump, allowing crews to operate hydraulic equipment prior to main engine start up. This function can also be used, on some aircraft, as a backup in flight in case of the loss of main engine power or hydraulic pressure.

APUs fitted to extended-range twin-engine operations (ETOPS) aircraft are an important backup system, as they supply backup electricity, compressed air and hydraulic power in the highly unlikely, yet postulated event of a loss of main engine power or a failed main engine generator. As such, operators flying ETOPS legs are required to track and record oil consumption rates to ensure the APU is always serviced with sufficient oil for the duration of the flight mission. To support that need, APU controllers will display oil quantity on a flight deck display.

Certain control systems have the capability of displaying quantity in discrete units, e.g., quarts or liters, or volume; however, displaying a consistent and accurate oil quantity while the APU is running is problematic. This is because these systems inadequately account for APU startup or shutdown gulp. To acquire a consistent oil quantity measurement with sufficient accuracy to permit ETOPS operation requires the aircraft maintenance operators to shut down the APU. Unfortunately, shutting down the APU is not preferred due to the increased time, work and inconvenience to restart the APU, e.g., hook up ground power, get a ground cart, etc. Therefore, aircraft manufacturers and operators are consistently looking for improved APU oil quantity measurement systems to support maintenance activities and reduce aircraft downtime.

Accordingly, it is desirable to provide methods and systems to determine and indicate an accurate oil quantity of an APU, particularly as the APU is running. Furthermore, other desirable features and characteristics of the present invention will become apparent from the subsequent detailed description and the appended claims, taken in conjunction with the accompanying drawings and the foregoing technical field and background.

SUMMARY

An APU oil quantity indication system and method establishes oil gulp on APU start up, during operation and at shutdown. As a result, it is possible to determine and indicate APU oil quantity whether the APU is running or off. Furthermore, stable oil quantity indication is possible during engine transients such as startup and rolldown after shutdown.

In one of the herein described embodiments, an APU oil gulp value may be established at APU startup and shutdown, respectively. The gulp value is combined with a continuous oil quantity indication to provide a stable oil quantity indication under all operating conditions, including transient conditions.

In still another embodiment, a method of and system for determining and indicating APU oil quantity includes establishing an APU oil gulp value at various phases of APU operation. An APU oil quantity is determined by combining the oil gulp value with a continuous oil quantity value. The method may further include indicating the APU oil quantity value.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
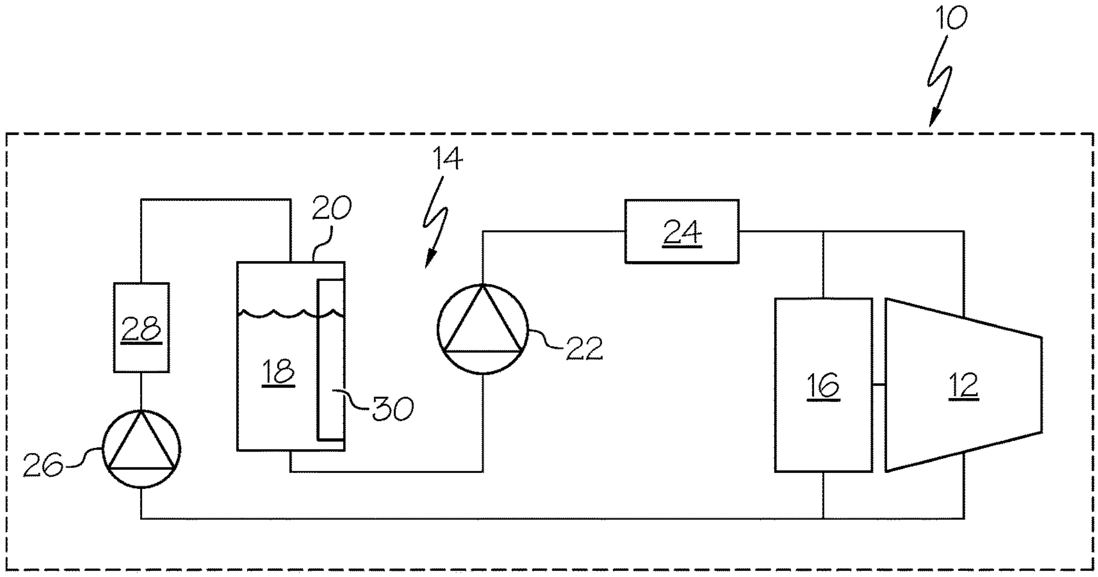
FIG. 1 is a functional block diagram of an APU lubrication system including an APU oil quantity indication system in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of electrical components, e.g., sensors, integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the systems described herein are merely exemplary embodiment of the invention.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

FIG. 1 provides a simplified depiction of an APU 10 that includes a turbine engine 12 and a lubrication system 14. The turbine engine 12 may be coupled to drive various equipment such as generators, pneumatic compressors, hydraulic pumps and the like generically indicated as drive 16. The lubrication system 14 provides lubricating oil 18 from a sump 20 to the turbine engine 12 and the drive 16. Lubricating oil 18 may be drawn from the sump 20 by a pump 22 and is communicated to the turbine engine 12 and the drive 16 via a cooler/filter 24. From the turbine engine 12 and the drive 16, oil may be returned to the sump 20 via scavenge pump 26 and a cooler/filter 28.

The lubrication system 14 includes an oil quantity sensor that provides an oil raw quantity indication in the form of an oil quantity value. For illustrative purposes, an oil quantity sensor 30 is shown disposed in association with the sump 20. Oil quantity sensing during operation of an APU is known, and any suitable sensor arrangement may be used to provide the oil raw quantity indication. Suitable oil quantity sensing arrangements include capacitive or linear variable differential transformer oil quantity sensors that generate an oil quantity value that is proportional to oil quantity in discrete units such as quarts or liters or in volume.

Figure 2:
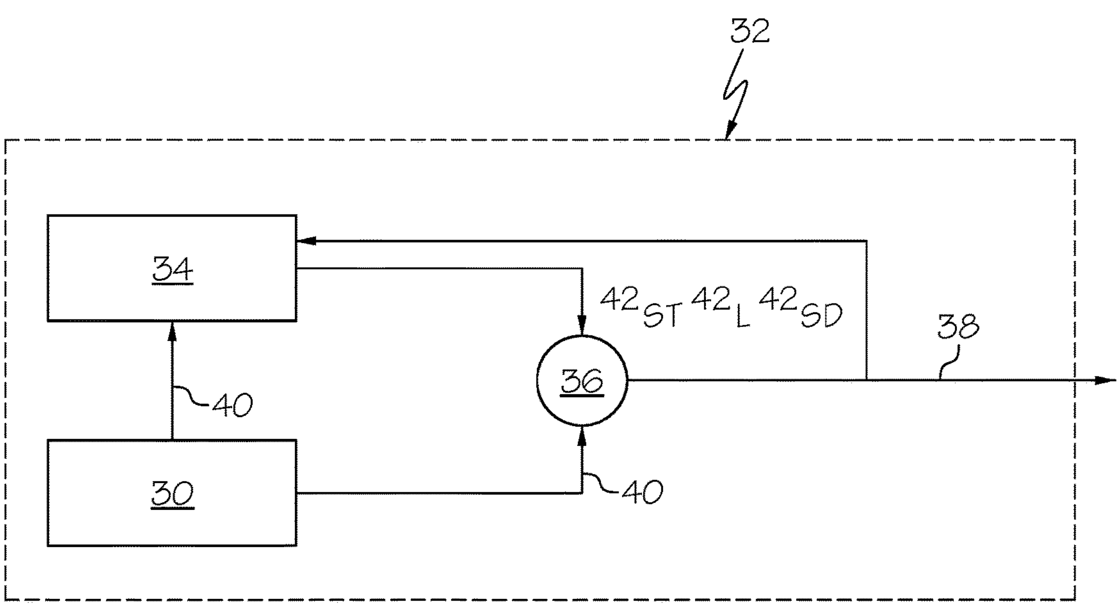
FIG. 2 is a functional block diagram of an APU control unit including an oil quantity indication system in accordance with various embodiments.

FIG. 2 illustrates an APU controller 32 that includes oil quantity sensor 30 and gulp value logic 34. The output of the sensor 30, as noted, is a raw oil quantity value 40. The output of the gulp value logic 34 is a gulp value 42 determined at various stages of APU operation. The raw oil quantity value 40 and the gulp value 42 are combined, e.g., summed, at combining logic 36 to provide an indicated oil quantity value 38. The indicated oil quantity value 38 may be in quarts, liters, volume or any other suitable set of units.

In accordance with various embodiments of the invention, the gulp value logic 34 calculates an engine gulp on APU start, while running and at shutdown providing, for example, first, second and third gulp values. For purposes of discussion, and with reference to FIG. 2, these values may be designated $\mathbf{42}_{ST}$, $\mathbf{42}_{L}$ and $\mathbf{42}_{SD}$. Combining the appropriate gulp value for the given operating state with the continuous raw oil quantity value 40 results in an oil quantity indication 38 that is substantially the same value when the APU is off, starting, running or rolling down after shut down, and which furthermore is an accurate indication of actual APU oil quantity.

When the APU is started, the gulp logic 34 determines a start up gulp value, $\mathbf{42}_{ST}$, as a difference between the last oil quantity value 38 and the raw oil quantity value 40 at start up. This value is then combined, e.g., added, into the continuously updated raw oil quantity value 40. In this regard, the gulp logic 34 will store or reference the last oil quantity value 38, e.g., as determined at shut down of the APU 10, and use this value to determine a startup gulp value, $\mathbf{42}_{ST}$ corresponding to initial APU 10 startup. During start up and until the APU 10 has reached governed operational speed, the gulp logic 34 will periodically determine the gulp value $\mathbf{42}_{ST}$ as a difference between the last oil quantity value 38 and the raw oil quantity value 40. With the gulp value $\mathbf{42}_{ST}$ continuously updated and added back to the raw oil quantity 40, a smooth and consistent oil quantity display is achieved as the APU goes from off to governed speed.

Once the APU 10 achieves governed operating speed, i.e., the turbine engine 12 reaches its normal continuous operating speed, the gulp logic 34 latches the gulp value, $\mathbf{42}_{L}$, to prevent the gulp term from continuing to increase as the APU 10 consumes oil, i.e. the oil quantity display would not show the effects of oil consumption. Moreover, because it is expected that the APU 10 will consume some amount of oil during operation, the APU controller 32 will latch the oil quantity 38 at APU shutdown and use this oil quantity to calculate the gulp term, $\mathbf{42}_{SD}$, during shutdown. This will result in smooth and consistent oil quantity display as the APU 10 goes from governed speed to off.

Figure 3:
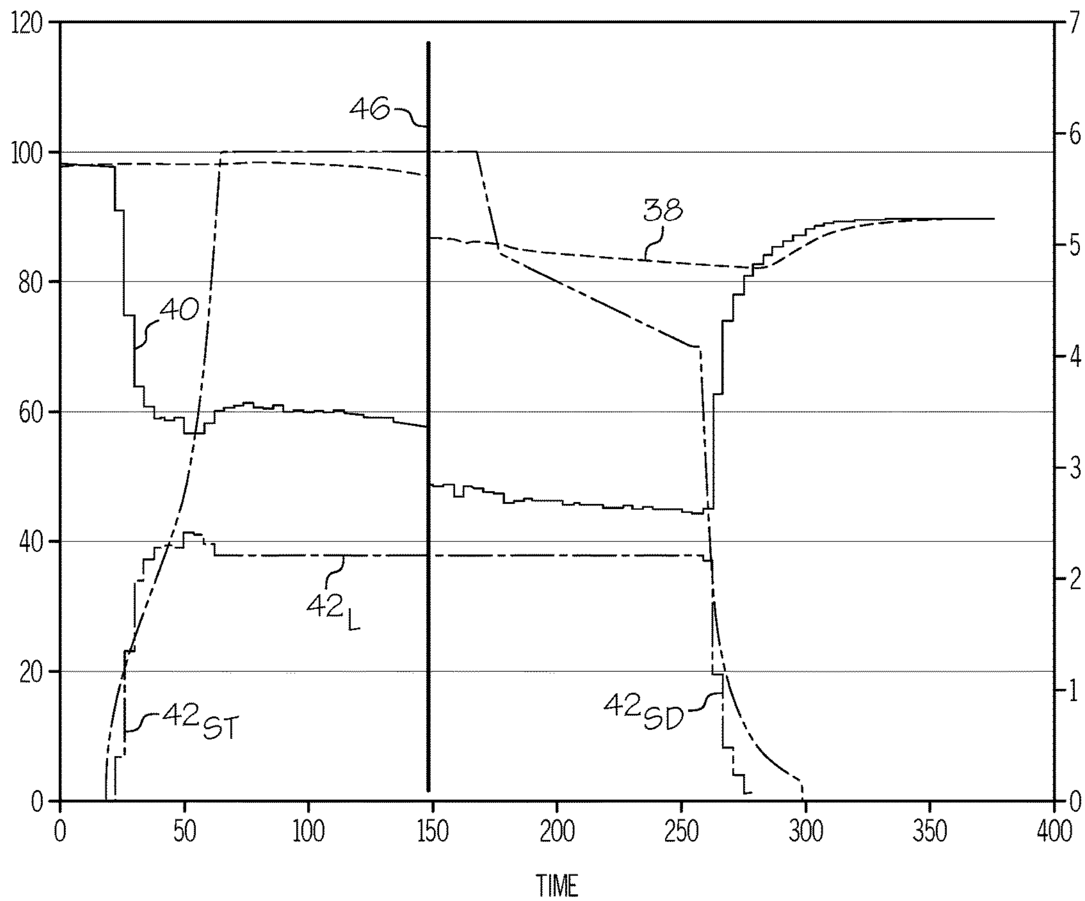
FIG. 3 graphic depiction of APU oil quantity.

FIG. 3 graphically depicts the values 38, 40 and $\mathbf{42}_{ST}$, $\mathbf{42}_{L}$ and $\mathbf{42}_{SD}$ in accordance with there herein described embodiments and operation of the gulp logic 34. In addition, the speed 46 of the APU turbine engine 12 is depicted to highlight the several states of APU 10 operation. The vertical black line is intended to represent a break in time so that the graphs may better represent the effect of oil consumption due to normal operation.

At initial APU 10 start up, raw oil quantity indication 40 illustrates a sharp drop corresponding to start up gulp. Correspondingly, the gulp value $\mathbf{42}_{ST}$ rises based upon the calculated difference between the oil quantity value, 38, and the raw oil quantity value, 40. Once the APU reaches governed operation, the gulp value, $\mathbf{42}_{L}$, is latched. With constant gulp value $\mathbf{42}_{L}$, the indicated oil quantity 38 decreases with time corresponding to oil consumption during use. After the APU 10 has completed its preparation to shutdown, the gulp value is unlatched and a shutdown gulp value, $\mathbf{42}_{SD}$ is established during APU 10 shutdown.

The gulp logic 34 may be modified to allow the gulp value $\mathbf{42}_{SD}$ to increase during APU shutdown to account for the effects of reduced scavenge efficiency. Such a modification may improve the stability of the indicated oil quantity 38 during shutdown processes. Suitable logic would be required to account for an aborted shutdown process. The gulp logic 34 may additionally compensate for temperature expansion, and may further bracket all gulp values, i.e., truncate the gulp value at low and high limits, to prevent anomalous results due to data errors or other transient conditions. The skilled person will further appreciate that filtering and other data smoothing techniques may also be employed.

In general, there is likely to be some variance between indicated oil quantity value 38 when the engine is running and just post engine shutdown. The quantity of oil that returns to the sump 20, and thus reflected in the raw oil quantity value 40, is dependent on oil temperature, age of the oil, de-oil capability, and other factors. If these factors are not accounted for, there may be an indicated oil quantity with some variation. FIG. 3 shows this condition in which more oil returns to the sump than was gulped on startup and some acceptable variation in indicated oil quantity 38 at shutdown, especially as the variation is greatly reduced as compared to existing systems and methodologies.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of indicating oil quantity in an auxiliary power unit (APU), the method comprising:

determining via a controller a raw oil quantity value indicative of a quantity of lubricating oil disposed within a lubrication system of the APU, establishing via the controller a gulp oil value, including establishing a first gulp oil value during a startup phase of the APU, a second gulp oil value during an operating phase of the APU during a period when an associated gas turbine engine of the APU is running and a third gulp oil value during a shutdown phase of the APU;

determining via the controller an indicated oil quantity based upon the raw oil quantity value and the gulp oil value; and graphically depicting via the controller the indicated oil quantity on a display.

2. The method of claim 1, wherein establishing via the controller the gulp oil value comprises establishing the gulp oil value during a startup phase of the APU and latching the gulp oil value during a governed operation phase of the APU.

3. The method of claim 1, wherein establishing via the controller the gulp oil value comprises establishing the gulp oil value based upon a shutdown indicated oil quantity and a startup raw oil quantity value.

4. The method of claim 1, wherein determining via the controller the indicated oil quantity based upon the raw oil quantity value and the gulp oil value comprises combining the raw oil quantity value and the gulp oil value.

5. The method of claim 1, wherein determining via the controller the indicated oil quantity based upon the raw oil quantity value and the gulp oil value comprises adding the raw oil quantity value and the gulp oil value.

6. The method of claim 1, further comprising determining via the controller a first raw oil quantity during a startup phase of the APU, a second raw oil quantity value during an operation phase of the APU and a third raw oil quantity value during a shutdown phase of the APU.

7. An auxiliary power unit (APU) oil quantity indicating system comprising:

a lubrication system having lubricating oil and a pump to deliver the lubricating oil to a turbine engine;

a sensor configured to provide a raw oil quantity value indicative of a quantity of the lubricating oil disposed within the lubrication system; and a controller, wherein the controller is configured to establish a gulp oil value and an indicated oil quantity based upon the raw oil quantity value and the gulp oil value, and to graphically depict the indicated oil quantity on a display, wherein, the gulp oil value is based upon a first gulp oil value during a startup phase of the APU, a second gulp oil value during an operating phase of the APU wherein an associated gas turbine engine of the APU is running and a third gulp oil value during a shutdown phase of the APU.

8. The system of claim 7, wherein the controller is configured to establish the gulp oil value based upon a shutdown indicated oil quantity and a startup raw oil quantity value.

9. The system of claim 7, wherein the controller is configured to establish the indicated oil quantity based upon a combination of the raw oil quantity value and the gulp oil value.

10. The system of claim 7, wherein the controller is configured to establish the indicated oil quantity based upon a sum of the raw oil quantity value and the gulp oil value.

11. An auxiliary power unit (APU) comprising:

a lubrication system having a sump and pump to deliver lubricating oil from the sump to a turbine engine, a sensor configured to provide a raw oil quantity value indicative of a quantity of oil disposed within the sump; and a controller, wherein the controller is configured to establish a gulp oil value and an indicated oil quantity based upon the raw oil quantity value and the gulp oil value, and to graphically depict the indicated oil quantity on a display, wherein, the gulp oil value is based upon a first gulp oil value during a startup phase of the APU, a second gulp oil value during an operating phase of the APU wherein an associated gas turbine engine of the APU is running and a third gulp oil value during a shutdown phase of the APU.

* * * * *